United States Patent [19]

Wika

[11] 4,047,685

[45] Sept. 13, 1977

[54] PORTABLE STAND FOR RELOADING PRESSES

[76] Inventor: Gilbert L. Wika, 333 Cedar Lane, Longview, Wash. 98632

[21] Appl. No.: 703,754

[22] Filed: July 9, 1976

[51] Int. Cl.² .................................................. A47G 29/00
[52] U.S. Cl. ................................... 248/158; 248/176
[58] Field of Search ................... 248/11, 12, 13, 121, 248/161, 159, 165, 166, 439, 176, 187, 150; 211/196

[56] References Cited

U.S. PATENT DOCUMENTS

| 1,637,705 | 8/1927 | Newman | 248/11 |
| 1,744,635 | 1/1930 | Holder | 248/158 |
| 2,524,490 | 10/1950 | Swett | 248/158 X |
| 2,615,771 | 10/1952 | Curtis | 248/165 X |
| 2,653,781 | 9/1953 | Niemeier | 248/150 |
| 2,655,335 | 10/1953 | Johnson | 248/166 |
| 3,669,392 | 6/1972 | Saunders | 248/150 X |

Primary Examiner—J. Franklin Foss
Attorney, Agent, or Firm—Oliver D. Olson

[57] ABSTRACT

A collapsible stand for mounting a reloading press has a base supporting an inclined pedestal the upper end of which is arranged for mounting the press on a vertical axis disposed intermediate transverse feet located at the front and rear ends of the base, providing a stable platform for operation of the press. A brace interconnects the pedestal and the base intermediate their ends securing the pedestal at its inclined orientation relative to the base. The stand is collapsible for storage to minimum dimensions with all of the components securable against displacement.

3 Claims, 5 Drawing Figures

PORTABLE STAND FOR RELOADING PRESSES

BACKGROUND OF THE INVENTION

This invention relates to a stand for supporting a reloading press, and more particularly to such a stand which is collapsible to compact size for convenient storage when not in use.

Reloading presses commonly are used to reload measured amounts of gun powder into metal cartridge casings and to secure new projectiles for re-use of the cartridges. However, reloading presses commercially available require mounting to a bench or countertop before use. This is unsuitable for persons not desiring to allocate a permanent area to a reloading press, such as those living in apartments or otherwise having limited space.

SUMMARY OF THE INVENTION

In its basic concept, the stand of this invention comprises a forwardly angled upright pedestal for mounting a reloading press on a vertical axis intersecting feet located at each end of a base supporting the pedestal, providing a stable platform for the press, wherein the components of the stand are collapsible to minimum dimensions and securable together against displacement for storage.

It is by virtue of the foregoing basic concept that the principal objective of this invention is achieved; namely, to provide a stand for reloading presses overcoming the aforementioned disadvantages and limitations of prior art loading presses.

Another object of this invention is to provide a stand of the class described which will mount the most common commercially available reloading presses.

Another object of this invention is to provide a stand of the class described which is of simplified construction for economical manufacture and is of rugged design for positive operation and long life.

The foregoing and other objects and advantages of this invention will appear from the following detailed description, taken in connection with the accompanying drawing of a preferred embodiment.

DETAILED DESCRIPTION OF A PREFERRED EMBODIMENT

Figure 1:
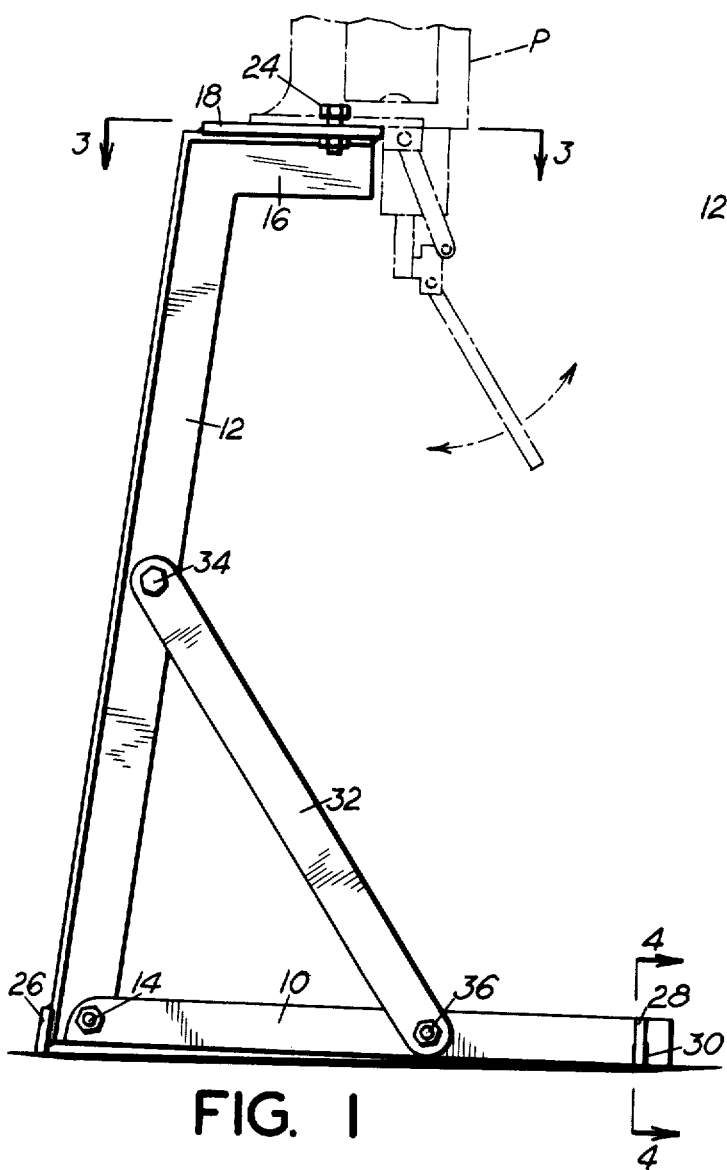
FIG. 1 is a view in side elevation of a reloading press stand embodying the features of this invention.
Figures 2, 5:
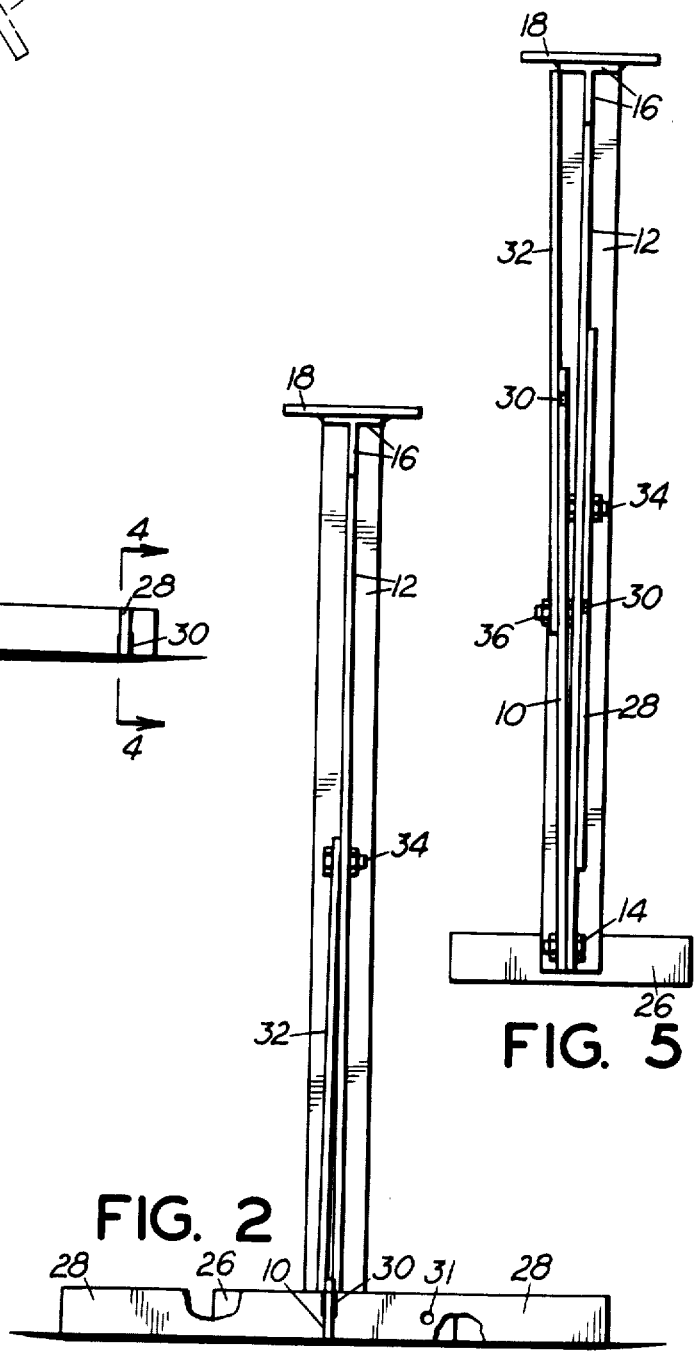
FIG. 2 is a front elevation as viewed from the right in FIG. 1, portions being broken away to disclose details of construction.
FIG. 5 is a view in front elevation showing the stand collapsed to its storage position.

Referring to FIGS. 1 and 2 of the drawings, the stand includes a base 10 in the form of an elongated bar beam of rectangular cross section. Preferably the base is approximately 20 inches in length, giving support of sufficient extent to maintain stability of the stand.

Mounted to the rear extremity of the base is an upright pedestal 12 for mounting the loading press P a spaced distance above the supporting surface on which the stand rests. The base and the pedestal are joined to each other pivotally by means such as bolt 14. Thus they may be moved relative to one another if desired and fixed in either a supporting position, FIG. 1, or in a storage position, FIG. 5, by tightening the bolt. The pedestal preferably is a T-shaped beam element and extends approximately 29 inches in length.

In the embodiment illustrated the upper portion 16 of the pedestal projects forwardly at an obtuse angle from the remainder of the pedestal. The angle is such that when the upper portion 16 is oriented parallel to the base, the extremity of the upper portion is positioned on a vertical axis intersecting the base intermediate its ends. In the embodiment illustrated this angle is approximately 97°, whereby the included angle between the base beam 10 and pedestal beam 12 is about 83°.

Figure 3:
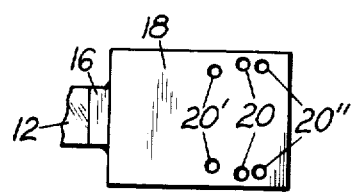
FIG. 3 is a fragmentary sectional view taken along the line 3—3 in FIG. 1.

A mounting platform 18 in the form of a flat, structural plate, is mounted on top of the upper portion 16 of the pedestal as by welding or other suitable means. A pair of mounting holes 20, FIG. 3, are located in the mounting platform for mounting the illustrated reloading press P in the position shown by the broken lines in FIG. 1. Two additional pairs 20' and 20'' of mounting holes are included to accommodate mounting the most common types of reloading presses. Bolts 24 fasten the reloading press to the mounting platform.

Joined intermediate its ends to the lower extremity of the pedestal 12 is a rear foot 26 of the form of a bar beam of rather short transverse dimension, conveniently about 8 inches. The foot is secured, as by welding, substantially normal to the base 10 with its lower, or supporting, surface slightly below the bottom of the base. This arrangement renders the stand more stable when supported upon a carpet or other soft or resilient surface. A front foot 28, also in the form of a bar beam, is mounted intermediate its ends to the forward extremity of the base 10. The front foot has a relatively longer transverse dimension than the rear foot, for example about 18 inches, and also is mounted so that its lower, or supporting, surface is coplanar with the bottom of the base.

Figure 4:
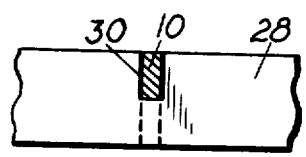
FIG. 4 is a fragmentary sectional view taken along the line 4—4 in FIG. 1.

The front foot is removable from the base, preferably by means of interfitting notches 30, as illustrated in FIGS. 1, 2 and 4. Thus, a notch is provided in the lower front edge of the base beam 10 to receive the front foot bar 28 and a notch is provided in the upper central edge of the front foot bar to receive the base beam.

A hole 31 is located intermediate the ends of the front foot for securing the foot to the stand for storage, as explained in detail hereinafter.

The pedestal 12 and the base 10 are interconnected intermediate their ends by means of brace 32 for securing the stand in its supporting position. As best illustrated in FIG. 1, the brace comprises an elongated bar beam having rounded extremities and defining openings at each end. The brace is attached to the pedestal and to the base by means of bolts 34 and 36, respectively, which pass through medial holes located in the base and pedestal and through the openings in the respective ends of the brace.

In the operation of the stand of the present invention, a standard reloading press P is attached to the top of the mounting platform 18 by means of bolts 24, as shown in broken lines of FIG. 1. The stand then is positioned in a free-standing condition on any convenient work surface, such as carpeted or uncarpeted floor, with the operator seated in front of it. The press then is operated in conventional manner for reloading bullets.

It will be noted that due to the forwardly facing angle of the pedestal 12 the reloading press is mounted on the stand so that its vertical axis intercepts the base 10 intermediate rear foot 26 and front foot 28. Therefore when the press is activated by downward movement of its lever arm, the resulting force is applied between the feet of the stand so that it provides maximum stability without being secured to the supporting work surface. It will be noted also that the base, in cooperation with the rear and front feet, provides a platform which is stable in all directions, preventing tipping of the stand when the press is activated.

When the loading operation is completed, the loading press is removed from the stand for storage. The stand then is folded to its storage position, as shown in FIG. 5.

To this end, bolt 34 is removed to disconnect the corresponding end of brace 32, after which the bolt 34 is reinserted in the hole in pedestal 12 but its nut not yet connected to it. Bolts 14 and 36 are then loosened. Base 10 then is folded upwardly adjacent to pedestal 12, abutting the head of bolt 34, brace 32 is swung out parallel to the base, and bolts 14 and 36 are then retightened. The front foot 28, having been removed from the base, is secured to the pedestal 12 on the side of the central rib opposite folded base 10, by placing bolt 34 through the hole 31 in the foot and the nut of bolt 34 is then installed and tightened.

Referring to FIG. 5, the foregoing folding operation is facilitated by orienting the bolts in the directions illustrated, i.e. with bolt 36 facing toward the left and bolt 34 facing toward the right. In this manner the bolt heads are interposed between the central rib of pedestal 12 and the base 10.

When the stand is to be used again, it is erected to its supporting position by reversing the procedure described.

It will be apparent to those skilled in the art that various changes may be made in the size, shape, type, number and arrangement of parts described hereinbefore, without departing from the spirit of this invention.

Having now described my invention and the manner in which it may be used, I claim:

1. A stand for supporting a reloading press, comprising:
   a. an elongated base beam having front and rear ends,
   b. an elongated pedestal beam,
   c. a bolt pivotally interconnecting the lower end of the pedestal beam and the rear end of the base beam,
   d. a diagonal brace beam extending between the base and pedestal beams intermediate their ends,
   e. bolts removably securing the opposite ends of the brace beam to the base and pedestal beams with the latter beams forming an included angle of about 83°,
   f. a mounting platform on the upper end of the pedestal beam adapted to mount a reloading press on a vertical axis intercepting the base beam between the front and rear ends of the latter, the upper end portion of the pedestal beam being offset angularly forward to support said mounting platform, the angle between the pedestal beam and its offset upper end portion being about 97°,
   g. a transverse bar at the lower end of the pedestal beam forming a rear lateral stabilizing foot, and
   h. a transverse bar at the front end of the base beam forming a front lateral stabilizing foot, the base beam being provided with a notch in its lower edge adjacent its front end and the transverse front foot bar being provided with a notch in its upper edge at its longitudinal center, said notches being dimensioned to interfit the foot bar and base beam at right angles.

2. The stand of claim 1 wherein the front foot bar is provided with an opening intermediate its ends for reception of one of the brace beam bolts for securing the front foot bar to the pedestal for storage.

3. A stand for supporting a reloading press, comprising:
   a. a single elongated base beam having front and rear ends,
   b. a single elongated pedestal beam secured pivotally at its lower end to the rear end of the base beam with one side of the base beam confronting one side of the pedestal beam,
   c. a single diagonal base beam extending between the base and pedestal beams intermediate their ends and secured by a pivot to the base beam and by a detachable pivot to the pedestal beam, with one side of the brace beam confronting the same said one side of the pedestal beam as does the base beam, whereby detachment of the base beam from the pedestal at said detachable pivot allows folding of the base beam and brace beam along side the pedestal beam,
   d. a transverse bar removably engaging the front end of the base beam and extending laterally to opposite sides thereof forming a front lateral stabilizing foot,
   e. the front foot bar having an opening intermediate its ends for reception of said detachable pivot when the beams are in folded condition, for securing the front foot bar to the pedestal beam for storage, and
   f. a mounting platform on the upper end of the pedestal beam adapted to mount a reloading press on a vertical axis intercepting the base beam between the front and rear ends of the latter.

* * * * *